(No Model.) 5 Sheets—Sheet 1.
J. D. SCHOFIELD.
COMBINED COTTON, CORN, AND SORGHUM PLANTER.
No. 404,056. Patented May 28, 1889.
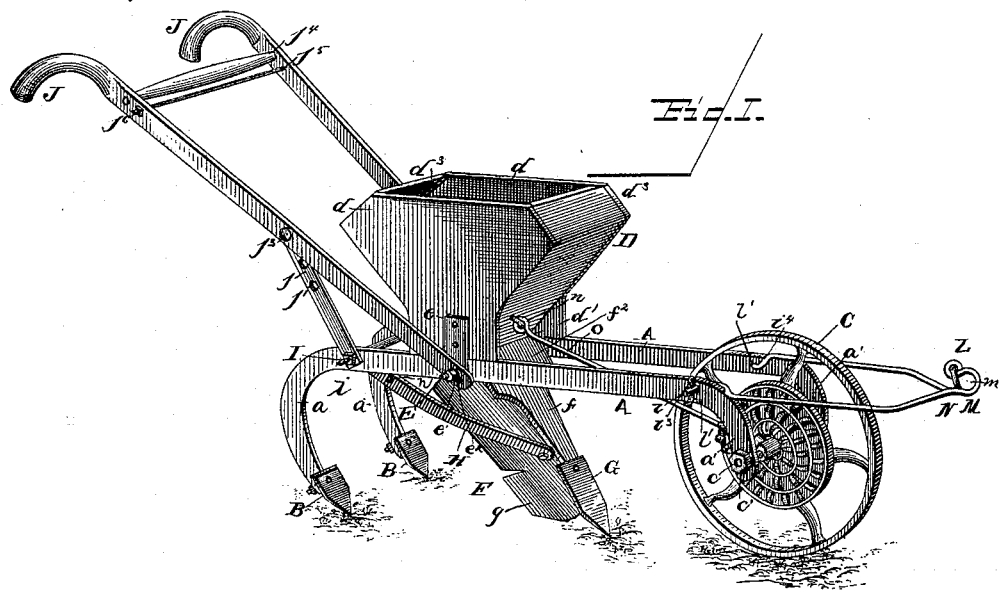
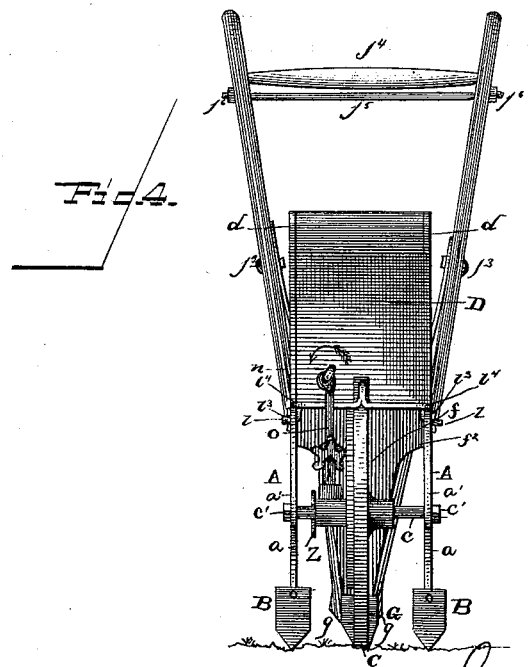
WITNESSES:
Wm. J. Little
A. Lee Lowe
James Drummond Schofield
INVENTOR
by J. R. Littell
Attorney (No Model.) 5 Sheets—Sheet 2.
J. D. SCHOFIELD.
COMBINED COTTON, CORN, AND SORGHUM PLANTER.
No. 404,056. Patented May 28, 1889.
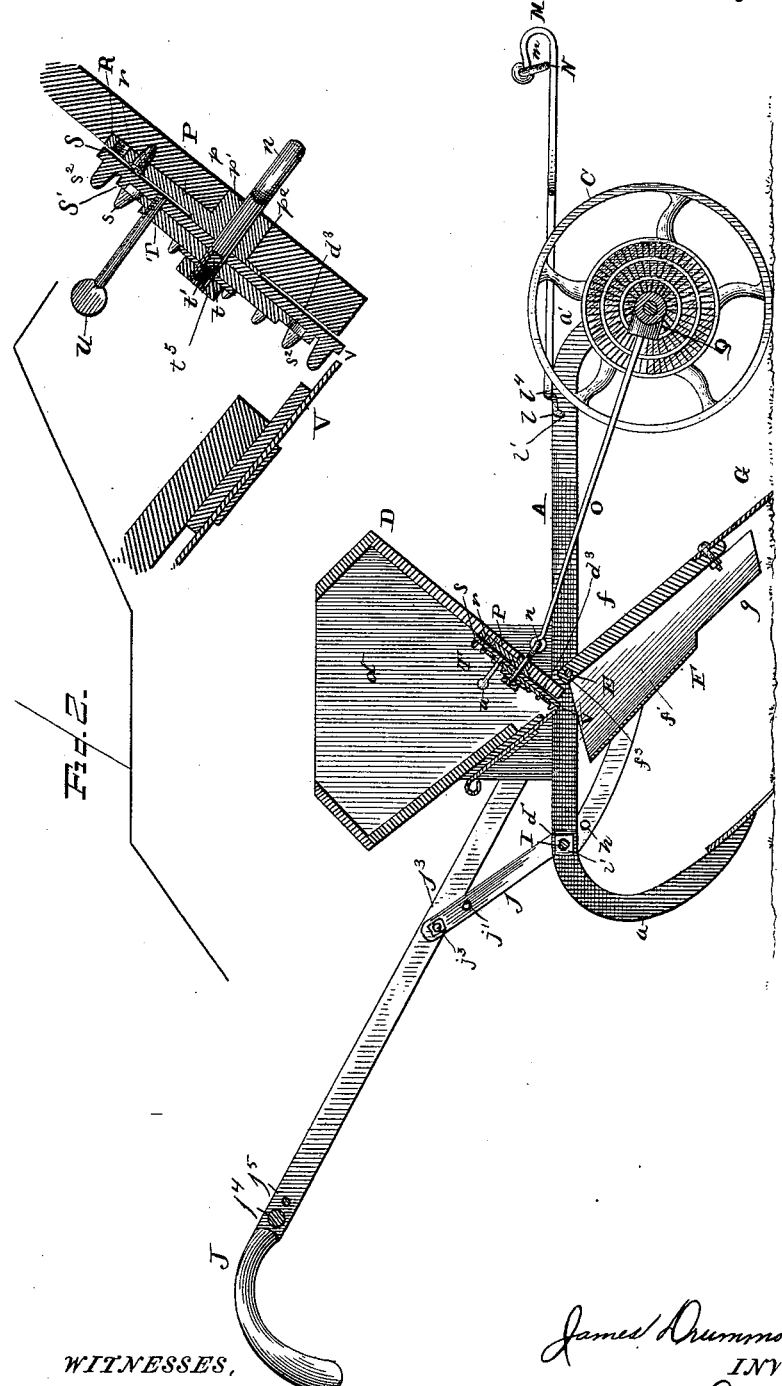

(No Model.) 5 Sheets—Sheet 3.
J. D. SCHOFIELD.
COMBINED COTTON, CORN, AND SORGHUM PLANTER.
No. 404,056. Patented May 28, 1889.
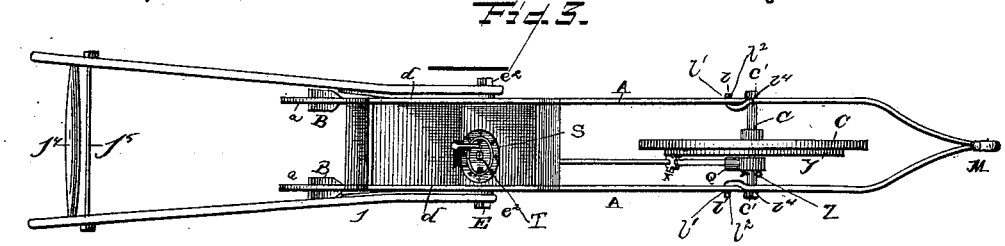
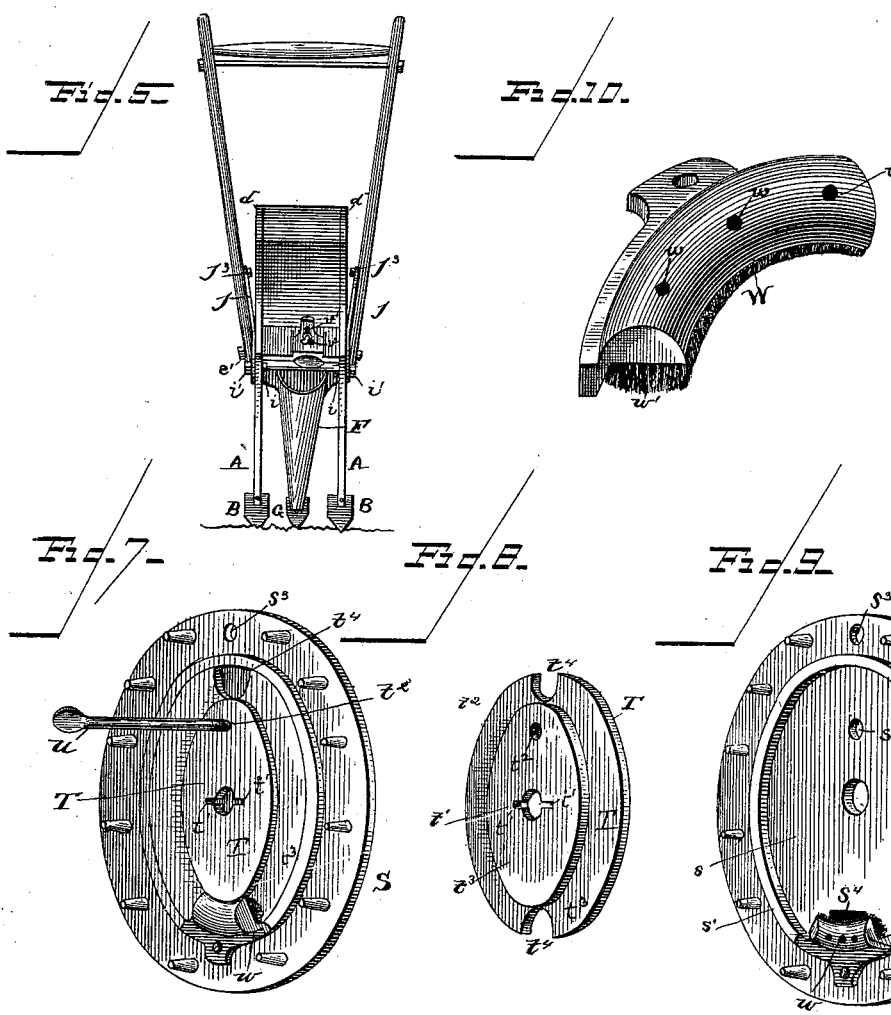
WITNESSES.
James Drummond Schofield.
INVENTOR
by
Attorney (No Model.) 5 Sheets—Sheet 4.
J. D. SCHOFIELD.
COMBINED COTTON, CORN, AND SORGHUM PLANTER.
No. 404,056. Patented May 28, 1889.
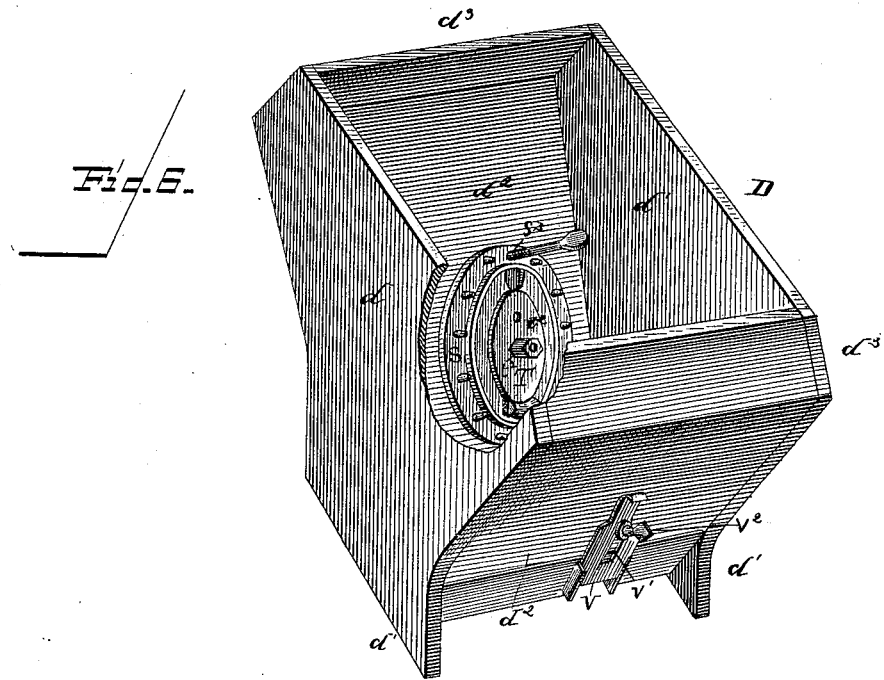
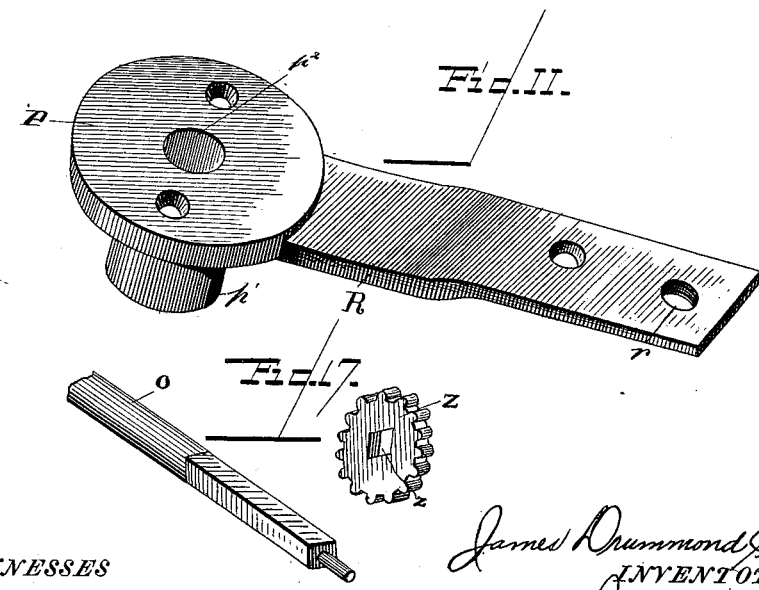
WITNESSES
James Drummond Schofield
INVENTOR
by
Attorney (No Model.) 5 Sheets—Sheet 5.
J. D. SCHOFIELD.
COMBINED COTTON, CORN, AND SORGHUM PLANTER.
No. 404,056. Patented May 28, 1889.
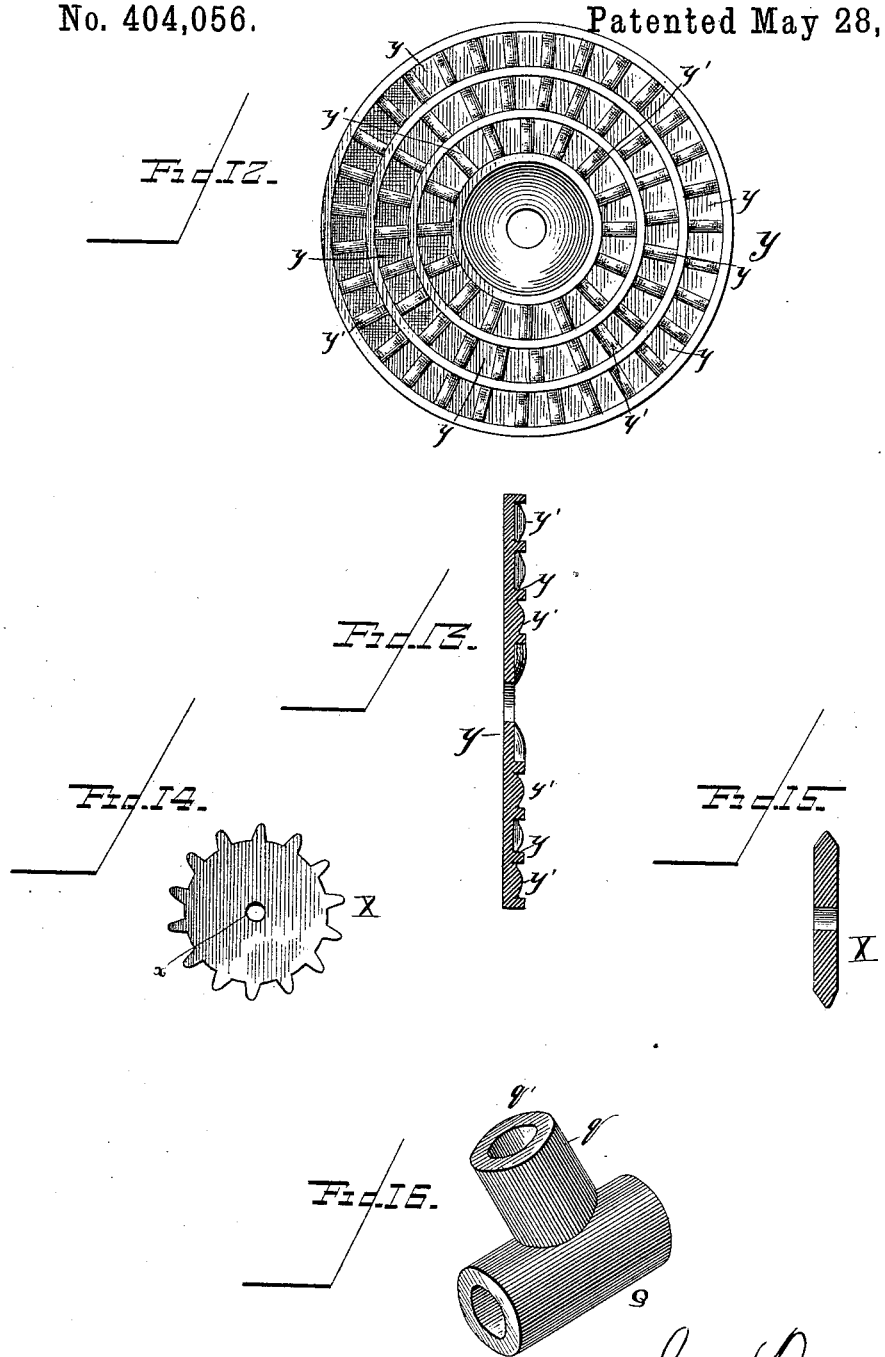
WITNESSES.
Wm. J. Littell
A. Lee Lowe
James Drummond Schofield
INVENTOR,
by J. R. Littell,
Attorney.

UNITED STATES PATENT OFFICE.

JAMES DROMMOND SCHOFIELD, OF ROGERS, TEXAS, ASSIGNOR TO THE FREMONT CULTIVATOR COMPANY, OF BELLEVUE, OHIO.

COMBINED COTTON, CORN, AND SORGHUM PLANTER.

SPECIFICATION forming part of Letters Patent No. 404,056, dated May 28, 1889.

Application filed January 3, 1889. Serial No. 295,296. (No model.)

*To all whom it may concern:*

Be it known that I, JAMES DROMMOND SCHOFIELD, a citizen of the United States, residing at Rogers, in the county of Bell and State of Texas, have invented certain new and useful Improvements in a Combined Cotton, Corn, and Sorghum Planter; and I do hereby declare that the following is a full, clear, and exact description of the invention, which will enable others skilled in the art to which it appertains to make and use the same.

This invention relates to a combined cotton, corn, and sorghum planters, and is designed as an improvement upon my application for patent filed October 11, 1888, Serial No. 287,794.

The object of the invention is to provide a machine of this class embodying a simple and improved construction and combination of feed-disks which may be quickly and readily adjusted to adapt them for planting the desired seed.

A further object of the invention is to provide simple and improved adjustable operating mechanism whereby the feed of the seed is regulated.

A further object of the invention is to provide new and adjustable bracing-rods for the drill, by which the cutting-depth of the opener-plow is regulated and held rigid when adjusted.

A further object of the invention is to provide an improved and simplified construction of frame and hopper, whereby the cost of manufacture is reduced to a minimum, and will at the same time possess advantages in point of durability and general efficiency.

In the drawings, Figure 1 is a perspective view of a planter embodying my invention. Fig. 2 is a vertical longitudinal sectional view taken through the driving-shaft, and showing the disks adjusted for planting cotton or sorghum. Fig. 3 is a top or plan view. Fig. 4 is a front elevation. Fig. 5 is a rear elevation. Fig. 6 is a detail perspective view of the hopper and disks, illustrating the latter adjusted for planting corn. Fig. 7 is a detail perspective view of the disks together. Figs. 8 and 9 are similar views of the same separated. Fig. 10 is a detail perspective view of the cut-off. Fig. 11 is a detail perspective view of the bearing-plate for the cotton-disk. Fig. 12 is a front elevation of the gear-disk removed from the carrying-wheel. Fig. 13 is a sectional view thereof. Fig. 14 is an elevation of the gear-wheel. Fig. 15 is a sectional view thereof. Fig. 16 is a detail perspective view of the bearing-block for connecting the axle and driving-shaft. Fig. 17 is a detail perspective view illustrating the manner of mounting the gear while upon the driving-shaft.

Corresponding parts in the figures are denoted by the same letters of reference.

Referring to the drawings, A A designate the two main beams of the frame, which are preferably constructed of spring-steel. These beams comprise the rearwardly-divergent approximately-horizontal main portions, having the down and forwardly curved ends $a$ $a$, to which are secured the coverer-plow B B. The front ends, $a'$ $a'$, of the beams are also curved downwardly and connected by a rigid axle, $c$, upon which is loosely mounted a centrally-located carrying-wheel, C, said axle being preferably secured to the beams by nuts $c'$, as shown.

D designates the hopper, preferably constructed of wood, and comprising the vertical sides $d$ $d$, having the upper portions of their edges inclined, while the lower portions are vertical and formed with a shoulder, $d'$, at their ends which rests upon the beams A. The front and rear walls $d^2$ $d^2$ are inclined and come together at their lower ends. The upper ends of the sides, $d$, are cut away at about right angles to their inclined edges, and between these cut-away portions are secured boards $d^3$, which partially close the flaring mouth of the hopper and prevent the seed from being thrown out when the planter is in operation. The hopper is retained upon the frame by two plates, $e$ $e$, which are secured to the sides thereof and project downwardly over the outer sides of the beams A. These plates and the beams are provided with coincident perforations $e'$, through which is passed a rod, E, provided at its screw-threaded ends with nuts $e^2$, said bolt thus securely locking the hopper to the frame.

The drill (designated by the letter F, and which is centrally located between the beams A) is composed of a front wall, $f$, preferably wood, and a metal plate, $f'$, curved to form the seed-tube, and having its vertical edges secured to the sides of the wall $f$. The front wall has a broadened upper end, as shown at $f^2$, which occupies the entire space between the beams A, and is provided with a perforation, $f^3$, by which it is loosely mounted upon the rod E. The opener-plow G is carried at the lower end of the wall $f$. The earth is prevented from returning to the furrow cut by the plow G before the seed has been dropped by two small mold-boards, $g\ g$. The latter are formed by cutting the lower ends of the metal plate $f'$ vertically and horizontally and then turning the wings formed thereby outwardly, as shown.

To attain the adjustment of the opener-plow to regulate the depth of the furrow, two corresponding spring-metal strips, H H, are employed. These strips are secured at their forward ends to near the lower front end of the drill, and from there project rearwardly and have their rear ends provided with longitudinal slots or a series of perforations, $h\ h$. These slots or perforations are engaged by a rod, I, which passes through the beams A. The rod I has its ends screw-threaded, and upon said ends are disposed inner and outer nuts, $i\ i$ and $i'\ i'$, respectively. To adjust the plow G, the drill is thrown nearer to or forwardly farther from a vertical plane to respectively cut a deep or shallow furrow. When adjusted, the inner nuts, $i$, are screwed against the strips H to lock the plow in adjusted position. The adjustment of the coverer-plows nearer to or farther from each other is accomplished by both the inner and outer nuts upon the rod I.

J J designate the handles, pivotally secured at their inner lower ends upon the ends of the rod E. From their point of attachment they project upwardly and rearwardly and are supported by adjustable rods or metal strips $j\ j$, secured at their lower ends to the rod I. These strips are provided at their upper ends with a series of perforations, $j'$, through which and coincident perforations in the handles are adapted to be passed bolts $j^3$ $j^3$. To adjust the height of the handles to a higher or lower position, the bolts are respectively passed through the higher or lower perforations $j'$. The handles are preferably braced near their rear ends by a cross-piece, $j^4$, and by a rod, $j^5$, upon the threaded ends of which are disposed nuts $j^6$.

To the front end of the frame is pivoted a draft-bail, L, preferably formed of a cylindrical iron rod. The pivot for the bail is formed by turning the ends $l\ l$ outwardly and passing said outturned ends through perforations $l'\ l'$, provided therefor in the beams A just in rear of the front turned-down ends. The ends $l$ are also each provided with a transverse perforation, $l^2$, engaged by a key, $l^3$, to retain said ends in their bearings. To prevent the bail from dropping below a horizontal plane when draft is not applied its sides are turned outward in front of its ends to form shoulders $l^4\ l^4$, which project over and rest upon the beams A. From these shoulders the sides of the bail are curved forwardly and inwardly, and at their point of intersection are formed into an upturned hook, M. The end of the hook is turned to form an eye, $m$, within which is pivoted a forwardly-inclined link, M. This link projects across the space formed by the hook, and is so disposed as to permit the insertion of a ring or other connecting device and lock it therein until it is desired to remove the same, when the link is elevated, and it is then withdrawn.

O designates the driving-shaft, preferably constructed of two sections connected by a link-joint, $n$, said shaft being journaled at its upper end in a bearing-plate, P, and at its lower end in a bearing-block, Q. The bearing-plate is adapted to be embedded in the front wall of the hopper at one side the lateral center thereof, and comprises a flat circular plate, $p$, located within the hopper and projecting slightly above the surface thereof, for the purpose hereinafter set forth. Projecting centrally from the under face of this plate and at right angles thereto is a cylindrical extension, $p'$, which projects entirely through the hopper, and through the plate and extension is provided a perforation, $p^2$, forming the bearing for the shaft. An arm, R, projects upwardly from the bearing-plate P, which is also embedded in the wall of the hopper and provided with a screw-threaded perforation, $r$, for the purpose hereinafter described. The plate P and arm R are, furthermore, provided with perforations for the reception of securing-screws.

The block Q is loosely mounted on the axle of the planter at one side the carrying-wheel, and from this block projects an arm, $q$, provided with a bearing-perforation, $q'$, at right angles to the axle for the reception of the end of the driving-shaft.

The upper end of the driving-shaft projects through the bearing P and into the hopper, and upon said end is loosely mounted a cotton-disk, S. By constructing the driving-shaft in two parts locked together the upper section projects through the front wall of the hopper at right angles to the plane thereof, and thus the disk S is permitted to fit closely against said wall.

T designates the corn-disk corresponding to and disposed within a circular recess, $s$, formed by a circular flange, S', on the upper surface of the cotton-disk. The end of the driving-shaft passes through a central perforation in the corn-disk, and the latter is locked thereto by a key, $t$, consisting of a short rectangular bar passed through a transverse elongated slot therefor in the shaft, said key engaging a diametrical slot, $t'$, provided in said disk. The extreme end of the shaft is screw-threaded, and upon said end is secured a nut, $t^2$, which prevents the displacement of the key. It will thus be seen that while the cotton-disk is loose upon the shaft the corn-disk is rigid thereon at all times.

I will now proceed to describe in detail the construction of the disks and the means and manner of adjusting them for planting the various kinds of seed for which the planter is intended.

To adapt the machine for planting cotton, the corn-disk is provided with a perforation, $t^2$, at one side its center, which is adapted to coincide with a screw-threaded perforation, $s'$, in the cotton-disk, and through these perforations is passed the screw-threaded end of a thumb-screw, $u$. The disks are thus locked together, and by reason of the rigid connection between the corn-disk and shaft the cotton-disk also revolves with the latter. The thumb-screw acts as a stirrer for the cotton-seed when the machine is in operation, and as the cotton-disk revolves the seed are forced through an opening, $v$, in the hopper by teeth $s^2$, which project upwardly from said disk near its periphery. The opening $v$ is at one side the lateral center of the hopper and directly below the driving-shaft, and said opening is provided with an adjustable slide, V, having a vertically-elongated slot, $v'$, through which is passed a thumb-screw, $v^2$, for adjusting said slide. The drill-tube is, as before described, disposed centrally between the beams A, the object of which being that as the cotton-disk revolves (in the direction indicated by the arrow, Fig. 4) and the teeth thereon strike the seed the latter are thrown to one side and are caught by the drill-tube, whereas if the latter was located directly below the opening $v$ a large quantity of the seed would be thrown past the tube and wasted.

The above-described method of planting cotton is also adapted for planting sorghum-seed; but in the latter case the opening $v$ is nearly closed by the slide V. If preferred, however, sorghum may be planted after the manner of corn, hereinafter described.

The construction and adjustment by which the planting of corn is carried out are as follows: The thumb-screw $u$ is removed from the perforations $t^2$ and $s'$, and passed through a perforation, $s^3$, near the periphery of the cotton-disk and into the threaded perforation $r$ of the arm R, before described. The cotton-disk is thus locked against rotation while the corn-disk revolves with the shaft. For feeding the seed the latter disk has a reduced portion, as shown at $t^3$, provided at its periphery with two or more semicircular notches, $t^4$, which, as the disk revolves, coincide with an opening, $s^4$, in the cotton-disk and on a vertical line with and below the center thereof. The front wall of the hopper is provided with a groove, $d^3$, extending from the opening $s^4$ of the cotton-disk to the outer edge of the hopper, said groove forming an outlet for the seed.

The object of providing the disk with feed-openings in the manner described will be obvious. In the form usually employed, consisting of a disk having circular holes, large grains frequently become wedged between the sides of said openings, and feeding therethrough is prevented until the grain is dislodged. In my improved construction of disk embodying the feed-openings at the periphery thereof I am enabled to form the openings in the shape of a half-circle, the continuation of which would be of much larger diameter than those usually employed. Thus the only manner in which a grain could be wedged would be across the opening or between the same and the cotton-disk, and in this case, owing to the cotton-disk being stationary, the grain would necessarily be loosened by the revolution of the corn-disk. Upon the outer face of the disk, at a point opposite the opening $s^4$ and projecting over the portion $t^3$ of the corn-disk, is rigidly secured a cut-off, W. The latter consists of a plate conforming in contour to the periphery of the corn-disk, and has a recessed inner and convex outer surface. Through this plate is provided a series of perforations, $w$, which are adapted to receive wire or other suitable bristles, $w'$, forming a brush, and are secured therein in any suitable manner. As the corn-disk revolves, all surplus seed are removed by the brush and only that carried within the feed-openings are dropped through the disks.

To impart motion to the driving-shaft, a gear-wheel, X, is employed, provided with a central angular opening, $x$, loosely mounted upon the lower portion of said shaft, the latter being constructed to conform to the opening in the gear. The gear is thus movable longitudinally on the shaft, but incapable of lateral motion independent thereof. Upon the adjacent side of the carrying-wheel is centrally secured a disk, Y, provided on its face with concentric rows of circular grooves $y$, each of which is crossed by an independent series of equidistant transverse ribs, $y'$, forming teeth adapted to mesh with the gear-wheel. The gear-wheel is held in engagement with the disk Y, preferably by an ordinary split key, Z, passed through a transverse perforation in the axle at the outer edge of the bearing-block Q. To change the speed of the feeding-disks, and consequently regulate the feed of the seed, the key Z is removed and the block Q drawn outwardly, releasing the gear-wheel from engagement with the disk Y. The gear-wheel can then be adjusted to mesh with the desired series of teeth, when the block is returned to its former position and the key inserted, thus securely locking the gear-wheel in engagement with the disk. The construction of the teeth upon the disk and gear-wheel herein shown I find preferable to the ordinary bevel-gear, for the reason that they have sufficient play to reduce friction and prevent binding, and will not become disengaged without the means of adjustment provided therefor being employed.

I do not wish to be understood as limiting myself to the exact construction herein shown and described, but reserve to myself the right to all such modifications as properly fall within the spirit and scope of my invention.

I claim as my invention—

1. The combination, with a hopper and a driving-shaft projecting therein, of a disk loosely mounted on the end of the shaft and adapted to be locked to the hopper, and a second disk corresponding to and disposed within a recess formed in the first disk, said second disk being rigidly connected with the shaft and adapted to be locked to the first disk, substantially as and for the purpose set forth.

2. In a planter of the class described, the combination, with a driving-shaft, of a disk mounted thereon, and a second disk corresponding to and disposed within a recess formed in the first disk and provided with a diametrical slot, a key disposed in a transverse elongated slot in the shaft and seated in the disk-slot to prevent movement of said disk independent of the shaft, and a nut screwed upon the shaft against the second disk to retain the key in place, both the disks being adapted to be locked together, substantially as set forth.

3. In a planter of the class described, the combination of a disk adapted to be locked stationary and having a circular flange conforming in contour to the periphery thereof, and having a recess provided with an opening, and a second disk corresponding and adapted to be disposed in the recess of the former disk and provided with approximately-semicircular feed-notches at its periphery adapted to coincide with the opening in the first-mentioned disk, substantially as and for the purpose set forth.

4. In a planter of the class described, the combination, with a hopper having an adjustable slide in its rear wall and with a driving-shaft projecting through the front wall at right angles thereto, of a cotton-disk loosely mounted upon the shaft and provided with a feed-opening and with a series of upright teeth near its periphery, said disk being adapted to be locked to the hopper with its feed-opening coinciding with a feed-groove in the front wall of the hopper, and a corn-disk rigidly mounted on the shaft and provided at its periphery with feed-notches adapted to coincide with the feed-opening in the cotton-disk, said corn-disk being adapted to be locked to the cotton-disk, substantially as and for the purpose set forth.

5. In a planter of the class described, the combination of a cotton-disk adapted to be locked stationary and provided with a circular flange conforming in contour to the periphery thereof and forming a central recess having a feed-opening, a corn-disk corresponding to and disposed within said recess and provided at its periphery with approximately-semicircular feed-notches adapted to coincide with the feed-opening in the cotton-disk, and a cut-off comprising a plate secured to the cotton-disk opposite the feed-opening and provided with perforations, and bristles secured in said perforations and forming a brush adapted to bear upon the top edge of the corn-disk, substantially as and for the purpose set forth.

6. In a planter of the class described, the combination, with a hopper and a driving-shaft extending therein, of a cotton-disk loosely mounted upon said shaft and adapted to be locked to the hopper when corn is to be planted, and a corn-disk rigidly mounted upon the shaft and adapted to be locked to the cotton-disk by an elongated thumb-screw to adapt the machine for planting cotton, said thumb-screw acting as a stirrer for the seed, substantially as and for the purpose set forth.

7. In a planter of the class described, the combination, with a hopper provided with a bearing-plate embedded in the front wall thereof and having an arm, and a driving-shaft having its upper end bearing in said plate, of a cotton-disk loosely mounted on the shaft and bearing against said plate, and adapted to be locked against rotation by a screw engaging a perforation in the disk and a coincident screw-threaded perforation in the arm of the bearing-plate, and a disk rigidly connected with the shaft and adapted to be locked to the cotton-disk by said screw through a perforation in the corn-disk and a coincident screw-threaded perforation in the cotton-disk, substantially as and for the purpose set forth.

8. In a planter of the class described, the combination of a cotton-disk provided upon its surface with a circular flange conforming in contour thereto, said disk being provided with a feed-opening between the flange and its center and adapted to be locked against rotation, and a corn-disk corresponding to and disposed within the recess formed by said flange and provided with semicircular feed-notches in its periphery adapted to coincide with the feed-opening in the cotton-disk, said flange forming a wall for the open edges of the feed-notches, substantially as and for the purpose set forth.

9. In a planter of the class described, the combination, with the frame, a hopper mounted thereon and provided in its rear wall with a feed-opening at one side its lateral center, and a driving-shaft projecting within the hopper directly above said feed-opening, of a drill disposed below said feed-opening and located at the lateral center of the planter, substantially as and for the purpose set forth.

10. In a planter of the class described, the combination, with a hopper, carrying-wheel, and axle, of a driving-shaft journaled at one end in the hopper and carrying planting-disks and at the other end in a laterally-adjustable block mounted upon the axle, a gear-wheel provided with a central angular perforation mounted upon the corresponding lower portion of the shaft and longitudinally adjustable thereon, a disk secured centrally to the carrying-wheel and provided with concentric rows of teeth adapted to mesh with the gear-wheel, and a key adapted to be passed through a perforation in the axle at the outer edge of the block to lock the gear-wheel in engagement with the disk, substantially as and for the purpose set forth.

11. In a planter of the class described, the combination, with the hopper, carrying-wheel, and shaft, of a two-part driving-shaft having one end journaled in said hopper and carrying planting-disks and at its lower end in a laterally-adjustable block mounted upon the axle and adapted to be locked thereon in adjusted position, the lower portion of said shaft being angular, a gear-wheel having a central perforation corresponding to said angular portion of the shaft and mounted thereon, and a disk centrally secured to the carrying-wheel and provided with a series of concentric grooves each of which is crossed by equidistant transverse ribs forming teeth adapted to mesh with the gear-wheel, substantially as and for the purpose set forth.

12. In a planter of the class described, the combination, with the frame, of an adjustable drill carrying an opener-plow at its lower end, said drill being pivotally mounted upon a transverse rod, and upwardly and rearwardly extending strips secured to the foot of the drill and provided with elongated slots at their rear ends embracing a second transverse rod, and nuts adapted to bind against said strips to lock the drill in adjusted position, substantially as and for the purpose set forth.

13. In a planter of the class described, the combination, with the frame the beams of which are connected by a front and rear transverse rod, of a drill carrying an opener-plow and pivotally mounted upon the former, the bearing portion of said drill extending across the space between the frame-beams, upwardly and rearwardly extending strips for bracing and adjusting the drill and plow secured at their forward ends to the foot of the drill and provided with elongated slots at their free ends engaged by the rear transverse rod, and nuts disposed on the latter adapted to be screwed against the strips to retain the plow in adjusted position, substantially as and for the purpose set forth.

14. The herein-described drill, comprising the front wall having the opener-plow secured at the foot thereof, the tube consisting of a curved metal plate having its side edges secured to the front wall, the lower end of said plate being cut vertically and horizontally, and the wings formed thereby curved outwardly to form mold-boards, substantially as and for the purpose set forth.

15. In a planter of the class described, the combination, with the frame comprising the horizontal beams having the downturned front ends, of a bail pivoted to the beams in the rear of said ends and formed with outwardly-projecting shoulders adapted to engage the upper edges of said ends to prevent the bail from falling below a horizontal plane, substantially as set forth.

16. In a planter of the class described, the combination, with the beams of the frame having the downturned front ends, of a bail provided with outturned ends bearing in perforations in the beams and keys passed through perforations in the ends of the bail, said bail being formed with outwardly-projecting shoulders adapted to rest upon the upper edge of the downturned beam ends to retain the bail in horizontal position, substantially as set forth.

17. In a planter of the class described, the combination, with the beams of the frame having the downturned ends, of a bail having its ends pivoted to said beams and provided with outwardly-projecting shoulders adapted to engage the upper edges of the downturned beam ends to retain the bail in horizontal position, the sides of said bail curving inwardly and terminating in an upturned hook, and a forwardly-inclined link pivoted in the end of the hook, substantially as and for the purpose set forth.

18. In a planter of the class described, the combination of the frame comprising two rearwardly-divergent beams having the downturned front ends carrying the axle and the downwardly and inwardly curved adjustable rear ends carrying coverer-plows, and the adjustable handles pivoted to said beams, substantially as and for the purpose set forth.

In testimony whereof I affix my signature in presence of two witnesses.

JAMES DROMMOND SCHOFIELD.

Witnesses:
D. A. WILLIAMS,
L. S. KINDER.